United States Patent [19]

Hunniford et al.

[11] Patent Number: 4,911,843

[45] Date of Patent: Mar. 27, 1990

[54] PROCESS FOR REMOVAL OF DISSOLVED HYDROGEN SULFIDE AND REDUCTION OF SEWAGE BOD IN SEWER OR OTHER WASTE SYSTEMS

[75] Inventors: David J. Hunniford; H. Forbes Davis, both of Tallevast, Fla.

[73] Assignee: Davis Water and Waste Industries, Inc., Tallevast, Fla.

[21] Appl. No.: 281,747

[22] Filed: Dec. 9, 1988

[51] Int. Cl.$^4$ .............................................. C02F 3/00
[52] U.S. Cl. ................................... 210/610; 210/631; 210/916; 435/264; 435/266
[58] Field of Search ............... 210/610, 611, 620, 631, 210/916; 435/264, 266, 282

[56] References Cited

U.S. PATENT DOCUMENTS

| | | | |
|---|---|---|---|
| 221,232 | 11/1879 | Hirsh | 423/210 |
| 1,701,825 | 2/1929 | Seil | 435/266 |
| 1,997,252 | 4/1935 | Fischer | 210/631 |
| 3,219,576 | 11/1965 | Makabe | 71/12 |
| 3,300,404 | 1/1967 | Howe et al. | 210/916 |
| 3,401,113 | 9/1968 | Pruessner et al. | 210/610 |
| 3,502,566 | 3/1970 | Raymond et al. | 210/610 |
| 3,607,736 | 8/1971 | Miyaji | 210/610 |
| 3,639,263 | 2/1972 | Troscinski et al. | 422/14 |
| 3,867,284 | 2/1975 | Kappe et al. | 210/631 |
| 3,930,998 | 1/1976 | Knopp et al. | 210/631 |
| 3,959,127 | 5/1976 | Bartha et al. | 210/610 |
| 3,959,130 | 5/1976 | Kloster et al. | 210/683 |
| 3,966,450 | 6/1976 | O'Neill et al. | 71/15 |
| 4,098,690 | 4/1978 | Semmens | 210/631 |
| 4,108,771 | 8/1978 | Weiss | 210/916 |
| 4,115,258 | 9/1978 | Smith et al. | 210/620 |
| 4,148,726 | 4/1979 | Smith | 210/620 |
| 4,153,547 | 5/1979 | McLean | 210/749 |
| 4,297,216 | 10/1981 | Ishida et al. | 210/631 |
| 4,446,031 | 5/1984 | List | 210/916 |
| 4,501,668 | 2/1985 | Merk et al. | 210/749 |
| 4,505,819 | 3/1985 | Barnes et al. | 210/610 |
| 4,680,127 | 7/1987 | Edmondson | 210/749 |
| 4,681,687 | 7/1987 | Mouche et al. | 210/916 |
| 4,725,405 | 2/1988 | Cassin et al. | 422/7 |
| 4,760,027 | 7/1988 | Sublette | 435/264 |

FOREIGN PATENT DOCUMENTS 3414556 10/1985 Fed. Rep. of Germany.
57-187099 11/1982 Japan.

*Primary Examiner*—W. Gary Jones
*Assistant Examiner*—Christopher Upton
*Attorney, Agent, or Firm*—Nixon & Vanderhye

[57] ABSTRACT

Removal of dissolved hydrogen sulfide and a reduction in BOD is achieved by the addition of nitrate ions to waste systems in an amount sufficient to stimulate growth of bacteria which utilize dissolved hydrogen sulfide in their metabolism. Specifically, about 2.4 lbs. oxygen per lb. of sulfide is required.

28 Claims, 1 Drawing Sheet

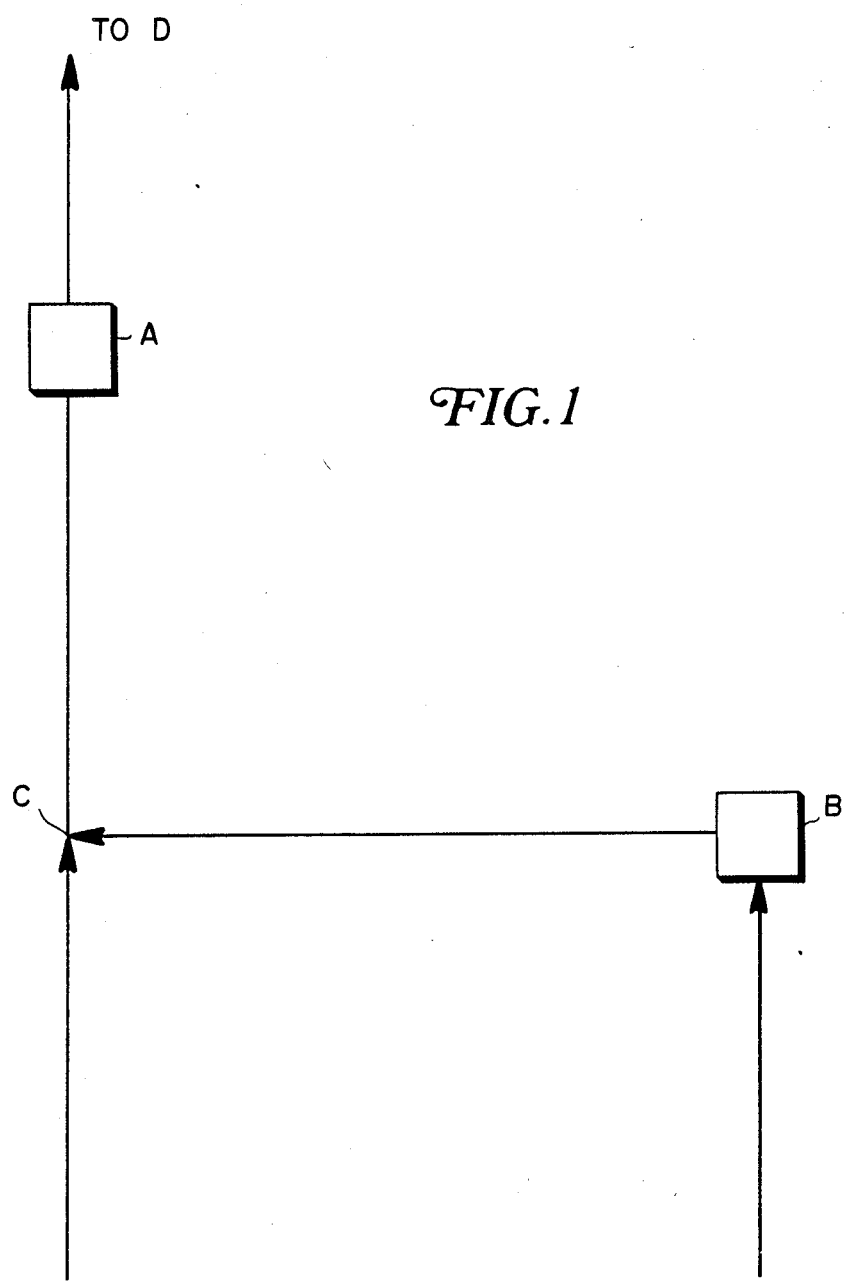

PROCESS FOR REMOVAL OF DISSOLVED HYDROGEN SULFIDE AND REDUCTION OF SEWAGE BOD IN SEWER OR OTHER WASTE SYSTEMS

BACKGROUND AND SUMMARY OF THE INVENTION

This invention relates to a process for the removal or reduction of dissolved hydrogen sulfide, and reduction of BOD in sewer systems, municipal waste treatment plants and in other industrial waste applications.

It is known to add nitrates or nitrites to sewage to effect reduction in BOD and even to suppress the formation of hydrogen sulfide gas via bacterial action. See, for example, U.S. Pat. Nos. 3,300,404; 4,446,031; and 4,681,687.

It is also known to add nitrates to sewage in order to control objectionable odors. See, for example, U.S. Pat. Nos. 3,966,450; 4,108,771.

There have also been attempts to remove hydrogen sulfide directly from waste. For example, in U.S. Pat. No. 4,680,127, the patentee adds amounts of glyoxal, or glyoxal in combination with formaldehyde or glutaraldehyde, in order to reduce or scavenge the amount of hydrogen sulfide in aqueous or wet gaseous mediums.

In U.S. Pat. No. 4,501,668, the patentee utilizes polycondensation products produced by the condensation of acrolein and formaldehyde to eliminate hydrogen sulfide present in aqueous systems, such as waste water clarification plants. Merk also mentions benefits relating to corrosion prevention and deodorization.

In U.S. Pat. No. 3,959,130, the patentee decontaminates sewage systems, waste water treatment plants and other industrial waste applications containing hydrogen sulfide by adjusting the pH of the sewage of a value over 7.0 and bringing the sewage into contact with an ash product.

It has now been discovered that the addition of nitrate, via an aqueous sodium nitrate solution, to sewage systems, waste treatment plants and other industrial waste applications containing dissolved hydrogen sulfide will result in the elimination or substantial reduction of the hydrogen sulfide, as well as the elimination of other "minor" odors associated with other sulphur-containing compounds.

It is believed that the addition of nitrate provides an oxygen source which promotes the growth of naturally occurring bacteria which utilize in their metabolism the sulfur tied up as hydrogen sulfide. It has been demonstrated both in lab jar tests and in an actual sewage collection system test, that dosing sewage containing over 50 mg/L of dissolved hydrogen sulfide with a sodium nitrate solution reduces the dissolved hydrogen sulfide to less than 0.1 mg/L. Along with this phenomena a significant reduction in sewage biological oxygen demand, BOD, of up to about 70%, and overall "sweetening", i.e., removal of other minor odors, of the sewage has been observed. These phenomena are believed to be the results of the biological process promoted by the nitrate addition.

More specifically, it has been found that 2.4 parts of nitrate oxygen ($NO_3$—O) are necessary to remove 1 part dissolved sulfide ($S^{2-}$). The source of nitrate to accomplish removal of the hydrogen sulfide is not specific, and aqueous solutions of both sodium nitrate and calcium nitrate appear to be suitable.

Because the necessary reaction is biochemical, it will not occur within a sterile solution, i.e., naturally occurring bacteria must be present. Moreover, the removal of hydrogen sulfide is not instantaneous. According to applicant's tests, an "incubation" period of about 8 to about 96 hours, and preferably about 24 to about 48 hours, is necessary to culture the bacteria, followed by about 1.5 to about 20 hours, and preferably about 3 to about 12 hours, for ongoing sulfide removal.

It has further been determined that the process in accordance with this invention achieves a significant reduction in sewage BOD due to the utilization of organic matter in the metabolism described.

Other objects and advantages will become apparent from the detailed description which follows.

BRIEF DESCRIPTION OF THE DRAWING

The FIGURE is a schematic diagram representing a sewage system employed in the Example described herein.

DETAILED DESCRIPTION OF THE INVENTION

Removal of dissolved hydrogen sulfide and a reduction in BOD in waste systems treated with sodium nitrate or calcium nitrate is believed to occur for the reasons described below.

The presence of dissolved hydrogen sulfide in sewage occurs as a result of a lack of dissolved oxygen. The addition of nitrate ions $NO_3$ provides an oxygen source for certain bacteria already present in the waste or sewage to thrive.

The bacteria that grow as a result of the nitrate oxygen utilize the dissolved hydrogen sulfide as part of their metabolism. The dissolved hydrogen sulfide contains sulfur which the bacteria also require in their metabolism.

It is theorized that the biochemical reaction which occurs has the following half reactions:

$$8 NO_3^- \rightarrow 4N_2 + 12O_2$$

$$12O_2 + 5H_2S \rightarrow 5SO_4^{2-} + 4H_2O + 2H^+$$

Based upon the above it is calculated that 2.4 parts of nitrate oxygen ($NO_3$—0) are necessary to remove 1 part of dissolved sulfide ($S^{2-}$):

$$\frac{8 \text{ moles } NO_3^-}{5 \text{ moles } H_2S} \times \frac{48 \text{ lb Oxygen/mole } NO_3^-}{32 \text{ lb Sulfide/mole } H_2S}$$

yields 2.4 lb oxygen/lb sulfide.

This ratio of oxygen to sulfide has been confirmed in both bench and field tests.

The source of nitrate to accomplish the sulfide removal is not critical, and both aqueous solutions of sodium nitrate and calcium nitrate have been used successfully.

This reaction is biochemical and it will not occur within a sterile solution, i.e., naturally occurring bacteria in sewage must be present. Additionally, the sulfide removal is not instantaneous; tests have shown that an "incubation" period of 24-48 hours is necessary to culture the bacteria and thereafter 3-12 hours for ongoing sulfide removal. It is believed, however, that the incubation period may extend from about 8 to about 96 hours, and the ongoing removal period from about 1.5 to about 20 hours, depending on conditions.

The promotion of biological activity via nitrate addition as described also achieves a reduction in sewage BOD due to the utilization of organic matter in the metabolism described.

EXAMPLE

With reference to the FIGURE, sodium nitrate was added to a sewer system in Jacksonville, Florida at a master pump station, or feed point B, upstream of a second master pump station comprising a monitoring point A. The feed point B was at a point removed from an intersection C of the feed line and main sewage line, as indicated in the FIGURE.

The treated sewage continued to a downstream waste water treatment plant in Jacksonville, indicated as point D.

Average detention times (based on average daily flows, line sizes and lengths are as follows:

B→C 7 hours
C→A 3.3 hours
B→A 10.3 hours

In terms of the description provided above, the B→C distance and retention time of 7 hours constitutes the incubation period, coupled with the distance C→A and associated retention time of 3.3 hours comprises a total of 10.3 hours from addition of the nitrate station at point B to the monitoring at point A, thereby permitting sufficient time for the bacteria to culture.

The following table shows the change in dissolved hydrogen sulfide at point A, with addition of nitrate occurring at point B.

TABLE I

| DATE | SODIUM NITRATE SOLUTION FEED - GPD | DAILY AVERAGE DISSOLVED $H_2S$ PPM AT POINT A |
|---|---|---|
| 2/22/88 | 0 | 35–40 |
| 2/23/88 | 0 | 30–50 |
| 2/24/88 | 1800 | 30 |
| 2/25/88 | 1800 | 15–20 |
| 2/26/88 | 1800 | 0.1–15 |
| 2/27/88 | 1200 | 0.1–4 |
| 2/28/88 | 1200 | 0.3–4 |
| 2/29/88 | 1200 | 0.1–8 |
| 3/01/88 | 650 | 0.7–1.5 |
| 3/02/88 | 650 | 1.0–1.5 |

During the period of time, the average daily $H_2S$ at point B was 25–30 ppm.

It is readily apparent from the above chart that significant reduction in $H_2S$ was achieved over a nine day period of time, commencing about 24 hours after the addition of the sodium nitrate, with maximum reductions occurring after 48 hours.

Subjective sampling also indicated a significant reduction in sewage odors other than hydrogen sulfide.

It was also found that sewage BOD was also reduced or indicated as in the following table:

TABLE II

| | BOD (mg/L) | | |
|---|---|---|---|
| DATE | POINT B | POINT A | POINT D |
| 03/02/88 | 165 | 112 | 138 |
| 03/03/88 | 145 | 55 | 135 |

It will thus be appreciated that the present invention provides for the removal of significant amounts of dissolved hydrogen sulfide and a corresponding reduction in sewage BOD. By properly feeding sodium nitrate into the sewage or waste, odor and corrosion problems can also be substantially eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for removing dissolved hydrogen sulfide from waste systems comprising the steps of:
    (a) adding nitrate ions to the waste in accordance with a ratio of at least 2.4 parts nitrate oxygen for each 1 part dissolved sulfide in order to provide a source of oxygen for naturally occurring bacteria present in the waste which utilize dissolved hydrogen sulfide in their metabolism;
    (b) providing sufficient time to culture said bacteria within said waste systems; and
    (c) providing ongoing time sufficient to enable said bacteria to remove the dissolved hydrogen sulfide.

2. A process according to claim 1 wherein said nitrate ions are provided by the addition of sodium nitrate to the waste.

3. A process according to claim 1 wherein said nitrate ions are provided by the addition of calcium nitrate to the waste.

4. A process according to claims 2 or 3 wherein a period of from about 8 to about 96 hours is provided in the practice of step (b).

5. A process according to claims 2 or 3 wherein a period of from about 24 to about 48 hours is provided in the practice of step (b).

6. A process according to claims 2 or 3 wherein a period of from about 1.5 to about 20 hours is provided in the practice of step (c).

7. A process according to claims 2 or 3 wherein a period of from about 3 to about 12 hours is provided in the practice of step (c).

8. A process according to claim 1 wherein a period of from 8 to about 96 hours is provided in the practice of step (b).

9. A process according to claim 8 wherein a period from about 1.5 to about 20 hours is provided in the practice of step (c).

10. A process according to claim 8 wherein a period from about 3 to about 12 hours is provided in the practice of step (c).

11. A process according to claim 1 wherein a period of from about 24 to about 48 hours is provided in the practice of step (b).

12. A process according to claim 11 wherein a period of from about 1.5 to about 20 hours is provided in the practice of step (c).

13. A process according to claim 11 wherein a period of from about 3 to about 12 hours is provided in the practice of step (c).

14. A process according to claim 1 wherein a period of from about 1.5 to about 20 hours is provided in the practice of step (c).

15. A process according to claim 1 wherein a period of from 3 to about 12 hours is provided in the practice of step (c).

16. A process according to claim 1 wherein sewage BOD is also reduced by up to about 70%.

17. A process according to claim 1 wherein said process further eliminates minor odors associated with other sulphur-containing compounds.

18. A process for removing from waste systems dissolved hydrogen sulfide and other minor odors associated with other sulphur-containing compounds comprising the steps of: providing a source of oxygen in the form of nitrate in the form of nitrate in the waste in sufficient amount to cause naturally occurring bacteria in the waste which utilize dissolved hydrogen sulfide and sulfur in their metabolism to grow, and providing sufficient time for the bacteria to culture in said waste, to thereby initiate a biochemical reaction which has the following half reactions:

$$8 NO_3 \longrightarrow 4N_2 + 12O_2$$

$$12O_2 + 5H_2S \longrightarrow 5SO_4^{2-} + 4H_2O + 2H^+$$

19. The process according to claim 18 wherein the source of oxygen comprises sodium nitrate.

20. The process according to claim 18 wherein the source of oxygen comprises calcium nitrate.

21. The process according to claim 18 wherein about 8 to about 96 hours is provided for the bacteria to culture.

22. The process according to claim 18 wherein about 24 to about 48 hours is provided for the bacteria to culture.

23. A process for removing dissolved $H_2S$ and reducing sewage BOD in sewer systems comprising the steps of:
   (a) adding a source of oxygen in the form of nitrate to the sewer system in an amount equal to about 2.4 lb. oxygen per lb. sulfide; and
   (b) providing about 8 to about 96 hours to allow naturally occurring bacteria already present in the system to culture as a result of the addition of said source of oxygen; and providing about 1.5 to about 20 hours to effect ongoing $H_2S$ removal and sewage BOD reduction.

24. The process according to claim 23 wherein said source of oxygen is sodium nitrate.

25. The process according to claim 23 wherein said source of oxygen is a calcium nitrate.

26. The process according to claim 23 wherein about 24 to about 48 hours is provided to allow bacteria present in the system to culture.

27. The process according to claim 23 wherein about 3 to about 12 hours are provided to effect ongoing $H_2S$ removal and sewage BOD reduction.

28. The process according to claim 23 wherein, during the process, additional minor odors associated with other sulphur-containing compounds are also eliminated.

* * * * *